(12) United States Patent
Naylor

(10) Patent No.: US 11,221,928 B2
(45) Date of Patent: Jan. 11, 2022

(54) METHODS FOR CACHE REWARMING IN A FAILOVER DOMAIN AND DEVICES THEREOF

(71) Applicant: NetApp, Inc., Sunnyvale, CA (US)

(72) Inventor: Brian Naylor, Raleigh, NC (US)

(73) Assignee: NETAPP, INC., Sunnyvale, CA (US)

( * ) Notice: Subject to any disclaimer, the term of this patent is extended or adjusted under 35 U.S.C. 154(b) by 298 days.

(21) Appl. No.: 16/387,913

(22) Filed: Apr. 18, 2019

(65) Prior Publication Data
US 2020/0334115 A1 Oct. 22, 2020

(51) Int. Cl.
*G06F 11/20* (2006.01)
*G06F 12/0815* (2016.01)

(52) U.S. Cl.
CPC ...... *G06F 11/2094* (2013.01); *G06F 12/0815* (2013.01); *G06F 2201/805* (2013.01); *G06F 2201/82* (2013.01); *G06F 2201/84* (2013.01); *G06F 2212/1032* (2013.01); *G06F 2212/608* (2013.01)

(58) Field of Classification Search
CPC ............. G06F 11/2094; G06F 12/0815; G06F 2201/805; G06F 2201/82; G06F 2201/84; G06F 2212/1032; G06F 2212/608
See application file for complete search history.

(56) References Cited

U.S. PATENT DOCUMENTS

| | | | | |
|---|---|---|---|---|
| 5,758,347 A | * | 5/1998 | Lo | G06F 16/00 |
| 6,757,695 B1 | * | 6/2004 | Noveck | G06F 3/0607 |
| 7,908,470 B1 | * | 3/2011 | Cavanna | G06F 9/4405 |
| | | | | 713/2 |
| 2008/0172523 A1 | * | 7/2008 | Tanaka | G06F 3/0625 |
| | | | | 711/103 |
| 2010/0049932 A1 | * | 2/2010 | Tan | G06F 11/1461 |
| | | | | 711/162 |
| 2012/0166390 A1 | * | 6/2012 | Merriman | G06F 16/2365 |
| | | | | 707/613 |
| 2015/0358417 A1 | * | 12/2015 | Patil | G06F 12/0868 |
| | | | | 709/219 |
| 2016/0077917 A1 | * | 3/2016 | Battepati | G06F 11/1451 |
| | | | | 714/15 |
| 2016/0092123 A1 | * | 3/2016 | Kumar | H04L 67/1097 |
| | | | | 711/118 |

(Continued)

*Primary Examiner* — Matthew M Kim
*Assistant Examiner* — Matthew N Putaraksa
(74) *Attorney, Agent, or Firm* — Troutman Pepper Hamilton Sanders LLP (Rochester)

(57) ABSTRACT

Methods, non-transitory machine readable media, and computing devices that facilitate cache rewarming in a failover domain are disclosed. With this technology, a tag is inserted into a local tagstore. The tag includes a location of data in a cache hosted by a failover computing device and is retrieved from a snapshot of a remote tagstore for the cache. An invalidation log for an aggregate received from the failover computing device is replayed subsequent to mounting a filesystem that is associated with the aggregate and comprises the data. The data is retrieved from the cache following determination of the location from the tag in the local tagstore in order to service a received storage operation associated with the data. Takeover nodes do not have to wait for a cache to repopulate organically, and can leverage the contents of a cache of a failover node to thereby improve performance following takeover events.

21 Claims, 6 Drawing Sheets

(56) References Cited

U.S. PATENT DOCUMENTS

| | | | | |
|---|---|---|---|---|
| 2016/0350350 A1* | 12/2016 | Shang | ................ | G06F 11/1448 |
| 2019/0230675 A1* | 7/2019 | Papa | .................. | H04L 12/4633 |
| 2020/0104259 A1* | 4/2020 | Wang | ................. | G06F 12/0842 |
| 2020/0257704 A1* | 8/2020 | Du | ..................... | G06F 11/2076 |

* cited by examiner

METHODS FOR CACHE REWARMING IN A FAILOVER DOMAIN AND DEVICES THEREOF

FIELD

This technology generally relates to data storage networks and, more particularly, to methods and devices for cache rewarming in a failover domain within a data storage network.

BACKGROUND

In many data storage networks, storage nodes (e.g., controllers or filers) share data storage devices in a cluster or array that may be hosted by a shelf or other enclosure. The storage nodes may be cooperating to provide high availability or other storage services for the storage network. As one particular example, the storage nodes may be a high availability (HA) pair of storage nodes in a failure domain that utilize an array of data storage devices hosted by one or more shelves in a Fibre-attached storage (FAS) architecture.

In order to improve performance, storage nodes can include a cache that can be hosted on non-volatile memory, such as flash memory. The cache can be populated by data that is read from the data storage devices of the storage array and has an increased likelihood of being accessed again by clients relatively soon. In a subsequent access request for the data, the data can advantageously be served from the local, high performance, low latency cache, thereby improving storage network performance.

Cache storage is generally owned by a single storage node, but the cache contents are maintained in a non-volatile memory and can be used by the storage node following a failure event through a process referred to as cache rewarming. Since the cache contents are not accessible during the failure event, some of the data may be stale or cold upon reboot of the storage node.

However, a partner or takeover node (e.g., in an HA pair) can keep track of data modifications (e.g., overwrites or invalidations) during the failure event, which can be replayed by the failed storage node upon reboot in order to rewarm the cache. Unfortunately, since the cache is not utilized or accessible to the takeover node during the failure event, the storage network experiences degraded performance and increased latency during the failure event and until the failed storage node comes back online and rewarms the cache.

DETAILED DESCRIPTION

Figure 1:
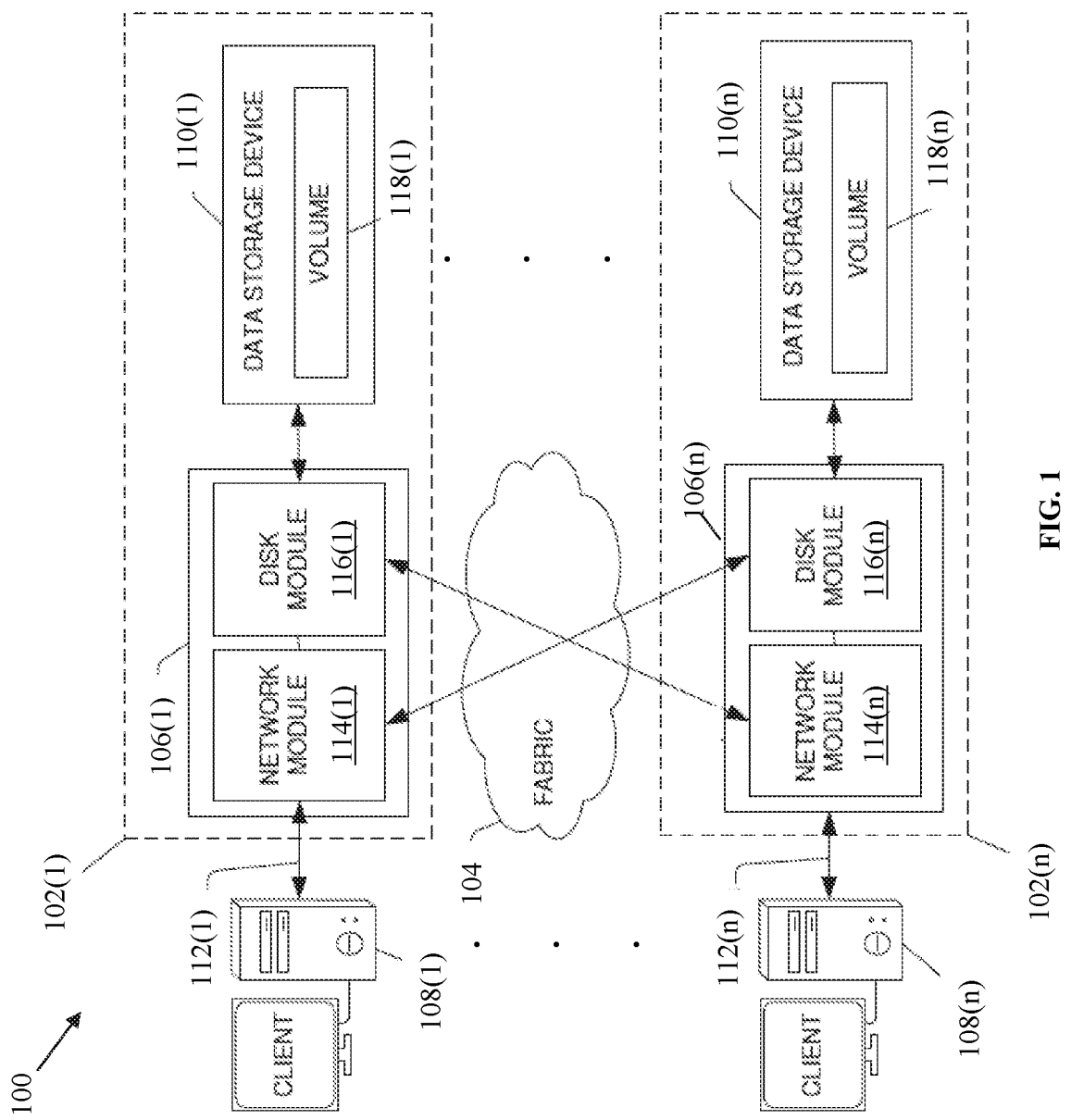
FIG. 1 is a block diagram of a network environment with exemplary node computing devices.

A clustered network environment 100 that may implement one or more aspects of the technology described and illustrated herein is shown in FIG. 1. The clustered network environment 100 includes data storage apparatuses 102(1)-102(n) that are coupled over a cluster or data fabric 104 that includes one or more communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and computing devices that facilitate cache rewarming in a failure domain to allow a takeover node computing device to leverage the cache of a failover computing device to improve performance and reduce latency across a takeover event.

In this example, node computing devices 106(1)-106(n) can be primary or local storage controllers or secondary or remote storage controllers that provide client devices 108(1)-108(n) with access to data stored within data storage devices 110(1)-110(n). The data storage apparatuses 102(1)-102(n) and/or node computing devices 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the request to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage, etc., for example. Such node computing devices 106(1)-106(n) can be attached to the fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving takeover node provides switchover access to the storage devices 110(1)-110(n) in the event a failure or planned takeover event occurs (e.g., the node computing device 106(1) provides client device 112(n) with switchover data access to storage devices 110(n)). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(n) can be configured to connect data storage devices 110(1)-110(2), such as disks or arrays of disks, SSDs, flash memory, or some other form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and/or remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more cloud storage device(s) to provide tiered storage, for example, and other arrangements can also be used in other examples.

In one example, to facilitate access to data stored on the disks or other structures of the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
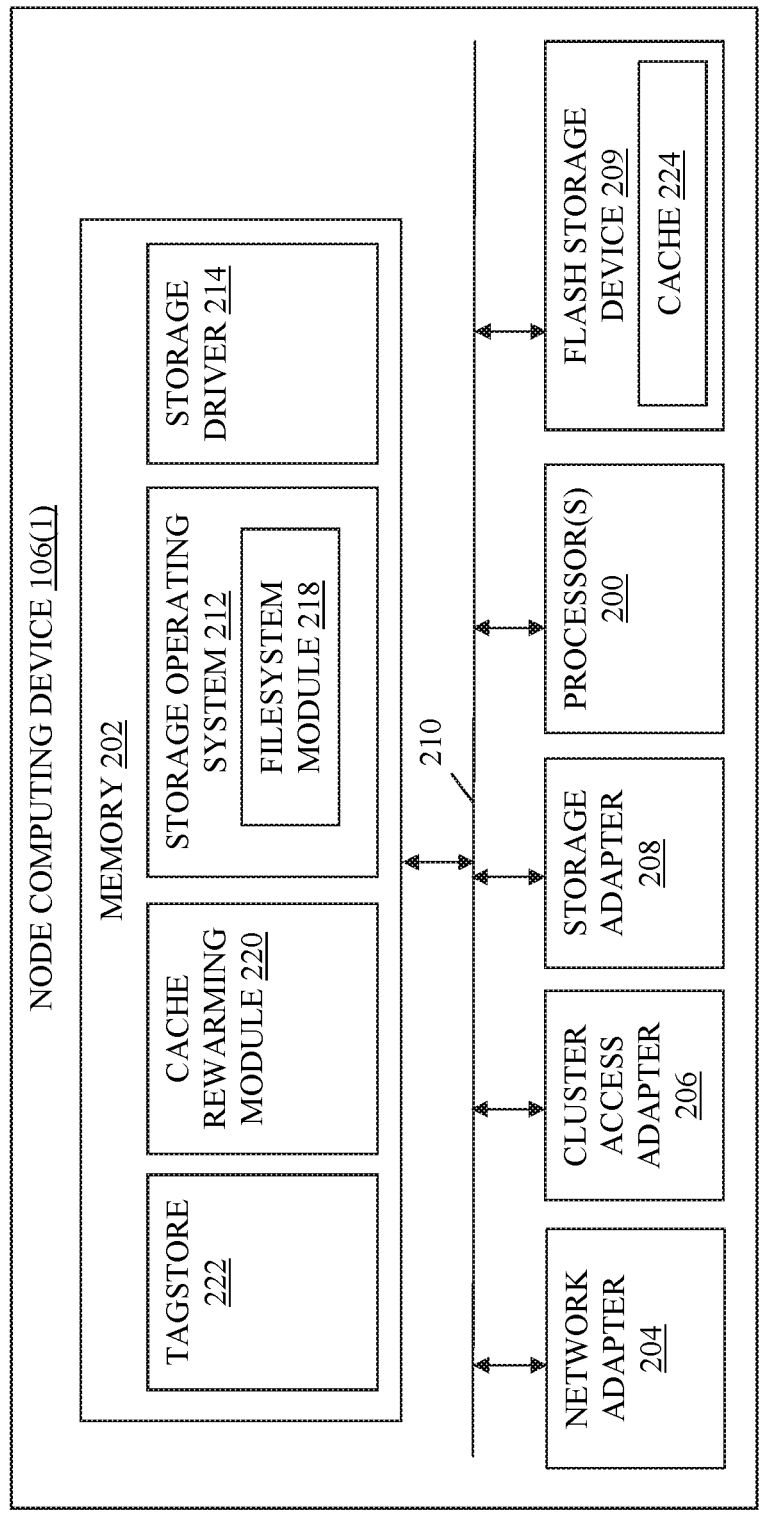
FIG. 2 is a block diagram of an exemplary node computing device.

Referring to FIG. 2, node computing device 106(1) in this particular example includes processor(s) 200, a memory 202, a network adapter 204, a cluster access adapter 206, a storage adapter 208, and a flash storage device 209 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a local area network. In some examples, the network adapter 204 further communicates (e.g., using TCP/IP) via the cluster fabric 104 and/or another network (e.g. a WAN) with cloud storage device(s) (not shown) to process storage operations associated with data stored thereon.

The storage adapter 208 cooperates with the storage operating system 212 executing on the node computing device 106(1) to access information requested by the client devices 108(1)-108(n) (e.g., to access data on one or more of the data storage devices 110(1)-110(n)). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the cluster fabric 104. In some examples, a storage driver 214 in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) or cloud storage device(s) (e.g., or additional clustered devices) in accordance with the client device requests.

The file system module 218 of the storage operating system 212 can establish and manage one or more filesystems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes a cache rewarming module 220 and a tagstore 222. The tagstore 222 includes tags that provide, among other information, a location for data block(s) maintained in the cache 224 to facilitate a cache lookups in response to storage operations received from the client devices 108(1)-108(n). The flash storage device 209 in this example includes dual-ported solid state disks (SSDs) to allow access to the cache 224 by other node computing devices, such as node computing device 106(n), in a same cluster as the node computing device 106(1).

In particular, the node computing devices 106(1) and 106(n) can be arranged as a high availability (HA) pair in some examples such that a takeover one of the node computing devices 106(1) and 106(n) will acquire the aggregates hosted by a failure one of the node computing devices 106(1) and 106(n) as part of a takeover event, such as an upgrade or planned outage for the failover one of the node computing devices 106(1) and 106(n). In these examples, the cache rewarming module 220 is configured to generate a metafile and a snapshot for the tagstore 222 and store the metafile and the snapshot on the flash storage device 209 when the node computing device 106(1) is operating as a failover node.

The cache rewarming module 220 is further configured to transition hosted aggregates and maintain an invalidation log during the takeover event subsequent to discontinuing service of storage operations from the cache 224. The operation of the cache rewarming module 220 when the node computing device 106(1) is operating as a failover node is described and illustrated in more detail with reference to FIG. 3.

The cache rewarming module 220 is configured to, when the node computing device 106(1) is acting as a takeover node for a takeover event, retrieve a metafile from a flash storage device of a failover node (e.g., a flash storage device of node computing device 106(n)). Using the metafile, the cache rewarming module 220 identifies the location of the snapshot of the remote tagstore of the failover node and reconstructs the remote tagstore within the local tagstore 222. The cache rewarming module 220 is further configured to brings the aggregates hosted by the failover node online.

Advantageously, subsequent to reconstructing the tagstore and bringing the aggregates online, the node computing device 106(1) operating as a takeover node can service storage operations from the cache of the failover node (e.g., node computing device 106(n). The cache of the failover node is accessible to the node computing device 106(1) operating as a takeover node because it is hosted by dual-ported flash storage device 209. The operation of the cache rewarming module 220 when the node computing device 106(1) is operating as a takeover node is described and illustrated in more detail with reference to FIGS. 4-6.

The examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

Figure 3:
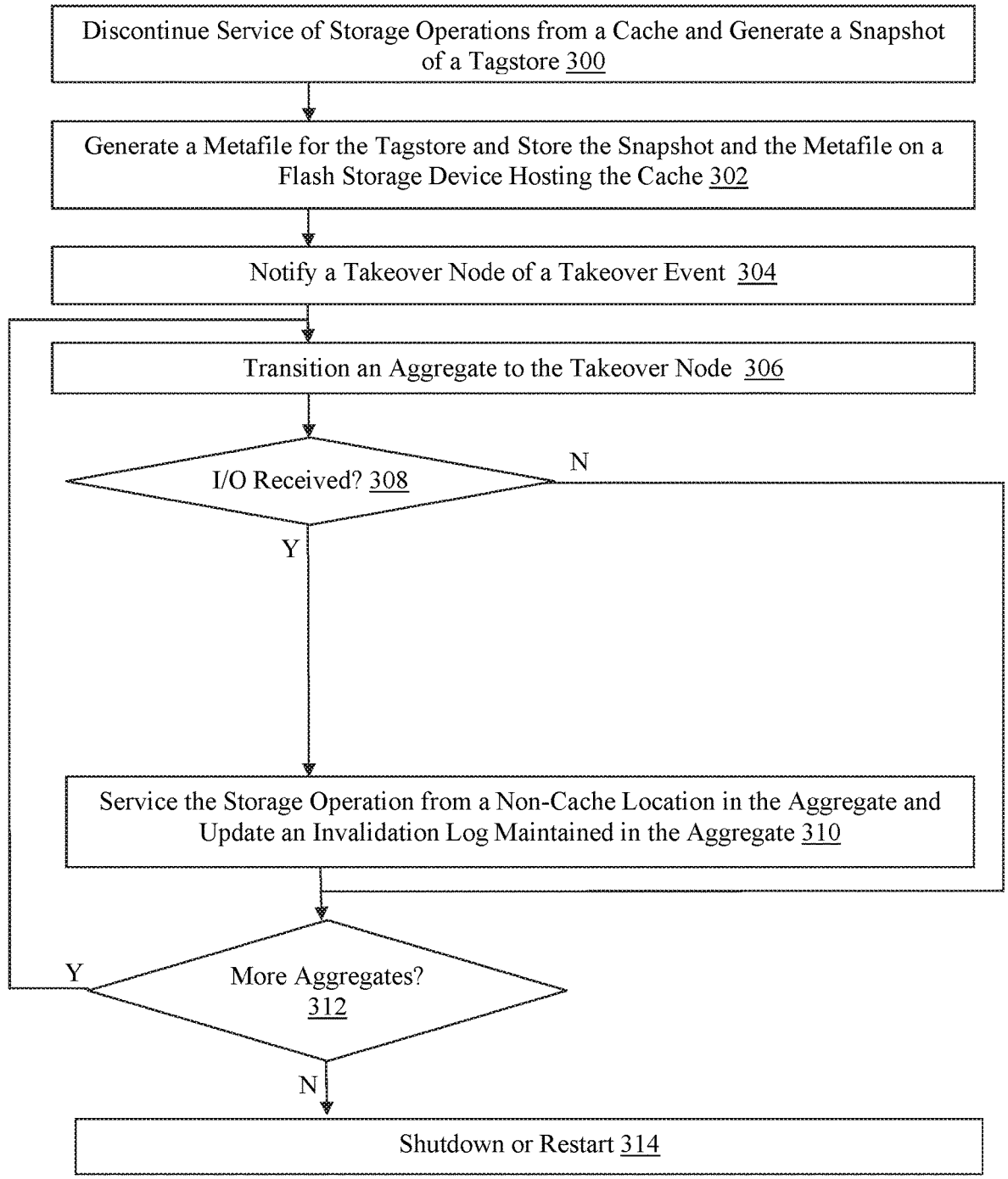
FIG. 3 is a flowchart of an exemplary method for initiating a takeover event by a failover node.

Referring more specifically to FIG. 3, a flowchart illustrating an exemplary method for initiating a takeover event by a failover node is illustrated. In the examples described and illustrated herein with reference to FIGS. 3-6, the node computing device 106(1) is operating as a failover node, which is undergoing a planned outage or other type of takeover event. Additionally, the node computing device 106(n) that is implemented as an HA pair in a failover domain with the failover node computing device 106(1) is operating as a takeover node. Accordingly, a reference numeral associated with a particular element in FIG. 1 and/or FIG. 2 is used herein to correspond to the same element in a respective one of the node computing devices 106(1) and 106(n). For example, the flash storage device 209(1) is hosted by the failover node computing device 106(1) and the flash storage device 209(n) is hosted by the takeover node computing device 106(n).

In step 300 in this example, the failover node computing device 106(1) discontinues service of storage operations from the cache 224(1) and generates a snapshot of the tagstore 222(1). In some examples, the failover node computing device 106(1) performs step 300 in response to an instruction from an administrator device (not shown) to initiate a planned or scheduled outage, such as for purposes of an upgrade for example, although a takeover event can be initiated in other ways and for other purposes. The tagstore 222(1) in this example stores data structures used in the volatile memory 202 to track blocks in the cache 224(1). The snapshot generated by the failover node computing device 106(1) in step 300 is a point-in-time copy of the tagstore 222(1).

In step 302, the failover node computing device 106(1) generates a metafile for the tagstore 222(1) and stores the snapshot and the metafile on the flash storage device 209(1) that is hosting the cache 224(1). The metafile in this example includes at least a location of the snapshot, and/or one or more portions thereof, on the flash storage device 209(1). In other examples, the metafile can include additional information useful to the takeover node computing device 106(n) for reconstructing the tagstore 222(1) and/or bringing the aggregates hosted by the failover node computing device 106(1) online, such as IDs for each of the aggregates, for example.

In this example, the metafile is stored in a particular location on the flash storage device 209(1) (e.g., a designated superblock) that the takeover node computing device 106(n) is preconfigured to retrieve it from, as described and illustrated in more detail later. In other examples, one or more of the metafile or the snapshot of the tagstore 222(1) can be stored in one of the aggregates (e.g., a root aggregate) hosted by the failover node computing device 106(1). In these examples, the takeover node computing device 106(n) can obtain the metafile and/or snapshot when the aggregate hosting the metafile and/or snapshot is transitioned to the takeover node computing device 106(n). In other examples, the metafile and/or snapshot of the tagstore 222(1) can be stored in other locations and/or obtained by the takeover node computing device 106(n) in other manners.

In step 304, the failover node computing device 106(1) notifies the takeover node computing device 106(n) of the takeover event that has been initiated. The notification can be a message communicated across the cluster fabric 104, for example, although other methods for notifying the takeover node computing device 106(n) can also be used in other examples.

In step 306, the failover node computing device 106(1) transitions an aggregate to the takeover node computing device 106(n). The transition can include releasing ownership of the aggregate and coordinating with the takeover node computing device 106(n) to obtain ownership of the aggregate such service of storage operations directed to the aggregate is continuous.

In step 308, the failover node computing device 106(1) determines whether any storage operations (also referred to as I/O) are received, such as from the client devices 108(1)-108(n), for example. Storage operations can be received that are associated with aggregates that have not yet been transitioned to the takeover node computing device 106(*n*). If the failover node computing device 106(1) determines that a storage operation is received, then the Yes branch is taken to step 310.

In step 310, the failover node computing device 106(1) services the storage operation from a non-cache location (i.e., from the aggregate on one or more of the data storage devices 110(1)-110(*n*)). The storage operation is serviced from the aggregate because the cache 224(1) was frozen in step 300 to ensure that the snapshot provides an accurate baseline of the contents of the tagstore 222(1). Additionally, any storage operations directed to data associated with an aggregate previously transitioned in step 306 will be sent instead to the takeover node computing device 106(*n*) that now owns the aggregate.

The failover node computing device 106(1) also updates an invalidation log maintained in the aggregate, if necessary, in step 310. The invalidation log includes an indication of each unique identification of data (e.g., block number) that was invalidated subsequent to the snapshot of the tagstore 222(1). For example, if a write storage operation is received in step 308 that is associated with a block in an aggregate that has not yet been transitioned, associated contents in the cache 224(1) (if any) will be invalid.

Accordingly, the failover node computing device 106(1) records the invalidation in the invalidation log for the aggregate so that it can subsequently be replayed as described and illustrated in more detail later with reference to step 608 of FIG. 6. In this example, the invalidation log is stored in the aggregate and atomically maintained by the storage operation system 212(1). Subsequent to servicing the storage operation in step 310, or if the failover node computing device 106(1) determines in step 308 that a storage operation has not been received and the No branch is taken, then the failover node computing device 106(1) proceeds to step 312.

In step 312, the failover node computing device 106(1) determines whether there are more aggregates to be transitioned to the takeover node computing device 106(*n*). If the failover node computing device 106(1) determines there is at least one additional aggregate remaining to be transitioned, then the Yes branch is taken back to step 306. However, if the failover node computing device 106(1) determines that there are no more aggregates to be transitioned, then the No branch is taken to step 314.

In step 314, the failover node computing device 106(1) shuts down or restarts in order to initiate the outage window for the takeover event. In other examples, one or more of steps 300-314 can occur in a different order or in parallel. In particular, storage operations can be received and processed in steps 308-314 while other aggregates are transitioned in steps 306, and other implementations are also possible.

Figure 4:
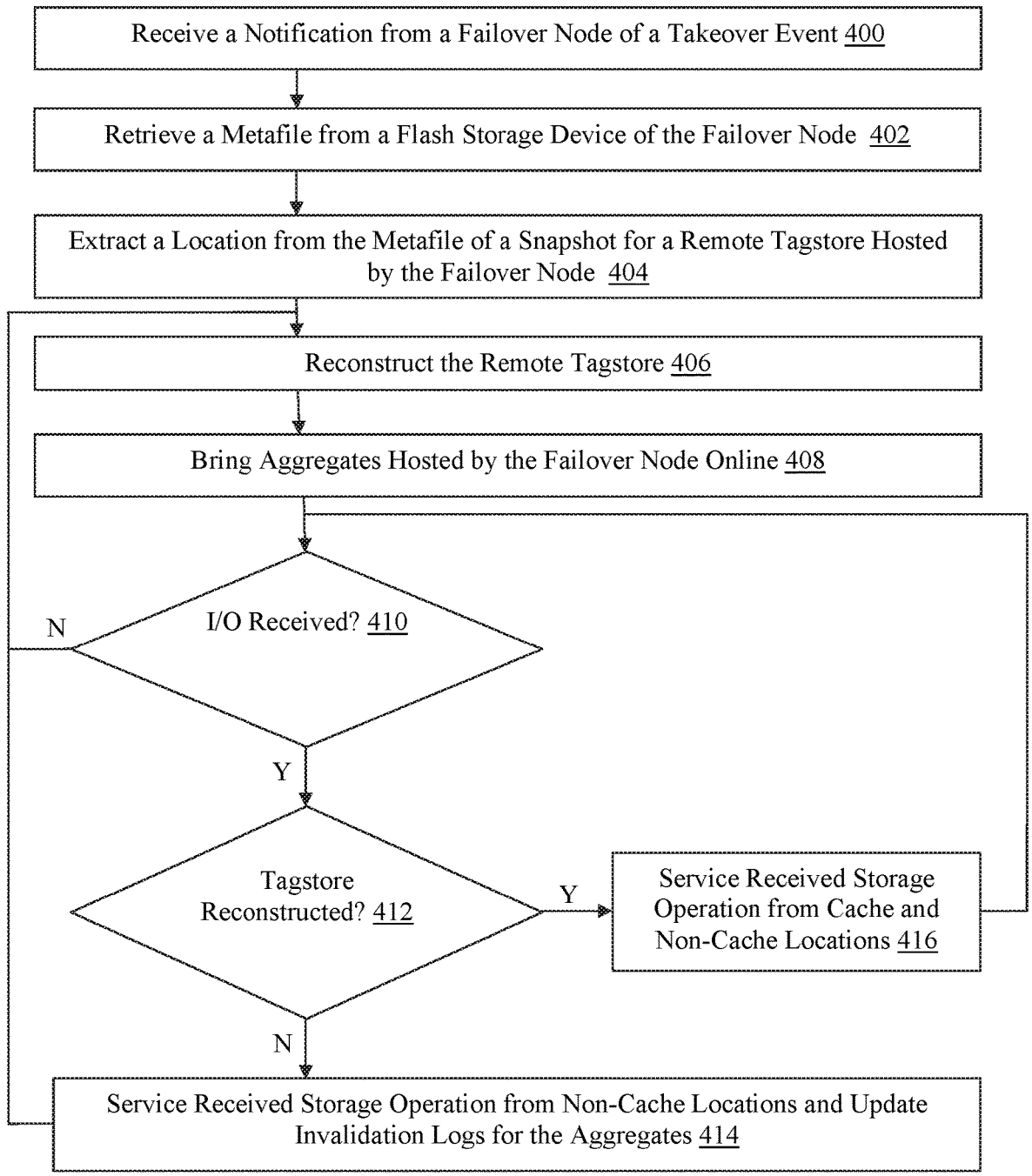
FIG. 4 is a flowchart of an exemplary method for rewarming, by a takeover node, a cache hosted by a failover node.

Referring more specifically to FIG. 4, a flowchart of an exemplary method for rewarming, by a takeover node, a cache hosted by a failover node is illustrated. In step 400 in this example, the takeover node computing device 106(*n*) receives a notification from the failover node computing device 106(1) of a takeover vent. The notification could have been sent as described and illustrated in more detail earlier with reference to step 304 of FIG. 3.

In step 402, the takeover node computing device 106(*n*) retrieves a metafile from the flash storage device 209(1) of the failover node computing device 106(1). The flash storage device 209(1) has more than one port (e.g., a dual port SSD) and therefore can be accessed by the takeover node computing device 106(*n*). The metafile could have been stored on the flash storage device 209(1) as described and illustrated in more detail earlier with reference to step 302 of FIG. 3. The takeover node computing device 106(*n*) in this example is configured to retrieve the metafile from an established location on the flash storage device 209(1) (e.g., a particular superblock), although the metafile can be retrieved in other ways.

In step 404, the takeover node computing device 106(*n*) extracts a location from the metafile of a snapshot for the tagstore 222(1) hosted by the failover node computing device 106(1), which is also referred to as a remote tagstore from the perspective of the takeover node computing device 106(*n*). The location corresponds to one or more storage locations on the flash storage device 209(1) hosted by the failover node computing device 106(1) in this example, although other storage locations for the snapshot can also be used in other examples.

In step 406, the takeover node computing device 106(*n*) reconstructs the remote tagstore 222(1) locally by effectively integrating some or all of the tags included in the snapshot of the remote tagstore 222(1) into the tagstore 222(*n*), which is also referred to herein as a local tagstore from the perspective of the takeover node computing device 106(*n*). The reconstruction of the remote tagstore 222(1) is a background process in this example that occurs while the aggregates from the failover node computing device 106(1) are being brought online, as described and illustrated in more detail later.

Figure 5:
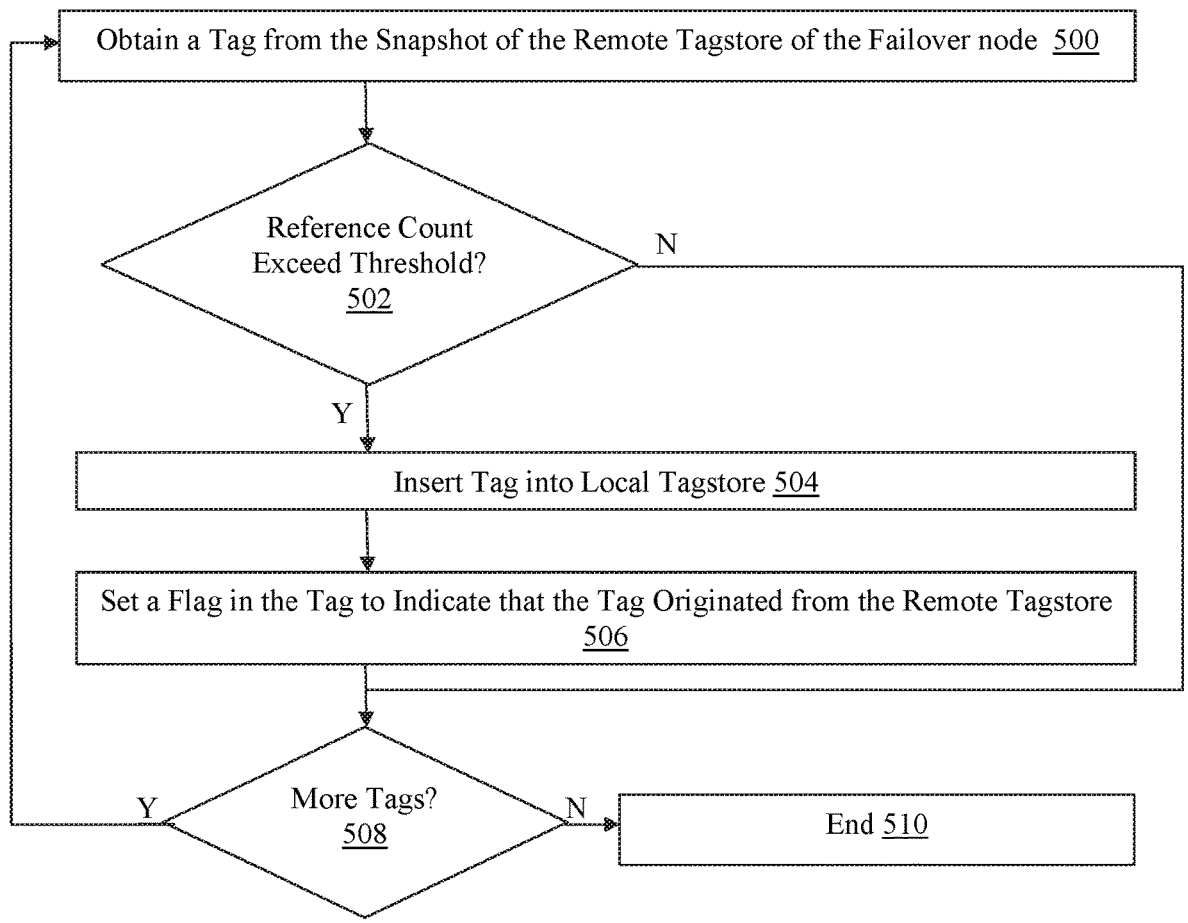
FIG. 5 is a flowchart of an exemplary method for reconstructing, by a takeover node, a tagstore for a cache hosted by a failover node.

Referring more specifically to FIG. 5, a flowchart of an exemplary method for reconstructing, by a takeover node, a tagstore for a cache hosted by a failover node is illustrated. In step 500 in this example, the takeover node computing device 106(*n*) obtains a tag from the snapshot of the remote tagstore 222(1) of the failover node computing device 106(1). The snapshot of the tagstore 222(1) is accessible to the takeover node computing device 106(*n*) in this example because the flash storage device 209(1) has more than one port. The tag is identified based on a location of the tag, and/or the snapshot of the remote tagstore 222(1), extracted from the metafile.

In step 502, the takeover node computing device 106(*n*) optionally determines whether a reference count in the obtained tag exceeds a threshold. The reference count corresponds with the number of time the tag and corresponding data has been accessed in a trailing period of time since insertion of the data into the cache 224(1) Generally, tagstores and associated snapshots are relatively large data structures that cannot be incorporated in their entirety into a local tagstore by a takeover node.

Accordingly, in this example, only the tags associated with data that is relatively active or likely to be accessed are incorporated as part of the tagstore reconstruction. In other examples, relatively unutilized tags in the local tagstore 222(*n*) could be removed, and associated entries in the cache 224(*n*) invalidated, instead or in combination with the selective incorporation of tags from the remote tagstore 222(1). If the takeover node computing device 106(*n*) determines that the reference count for the obtained tag exceeds the threshold, then the Yes branch is taken to step 504.

In step 504, the takeover node computing device 106(*n*) inserts the tag into the local tagstore 222(*n*). Accordingly, subsequent to completion of the takeover event, the tag can be used by the takeover node computing device 106(*n*) to service received storage operations from the cache 224(1) hosted by the failover node computing device 106(1), as described and illustrated in more detail later with reference to step 414 of FIG. 4.

In step 506, the takeover node computing device 106(n) optionally sets a flag in the tag, which can be a bit or any other indication that the tag originated from the remote tagstore 222(1). In some examples of this technology, the failover node computing device 106(n) can take effectively take the cache 224(1) back subsequent to the takeover event (e.g., upon rebooting). Accordingly, recording the tags that originated from the remote tagstore 222(1) facilitates a more efficient give back process.

Subsequent to setting the flag, or if the takeover node computing device 106(n) determines in step 502 that the reference count does not exceed the threshold and the No branch is taken, then the takeover node computing device 106(n) proceeds to step 508. When the No branch is taken from step 502, the obtained tag can be discarded or otherwise not inserted into the local tagstore 222(n)

In step 508, the takeover node computing device 106(n) determines whether there are more tags to be obtained from the snapshot of the remote tagstore 222(1) of the failover node computing device 106(1). If the takeover node computing device 106(n) determines that there is at least one additional tag, then the Yes branch is taken back to step 500. However, if the takeover node computing device 106(n) determines in step 508 that there are no more tags, then the No branch is taken to step 510 and the process of reconstructing the remote tagstore 222(1) ends.

Referring back to FIG. 4, in step 408 the takeover node computing device 106(n) brings the aggregates hosted by the failover node computing device 106(1) online. Bringing the aggregates online in step 408 can occur concurrently with reconstructing the remote tagstore in step 406.

Figure 6:
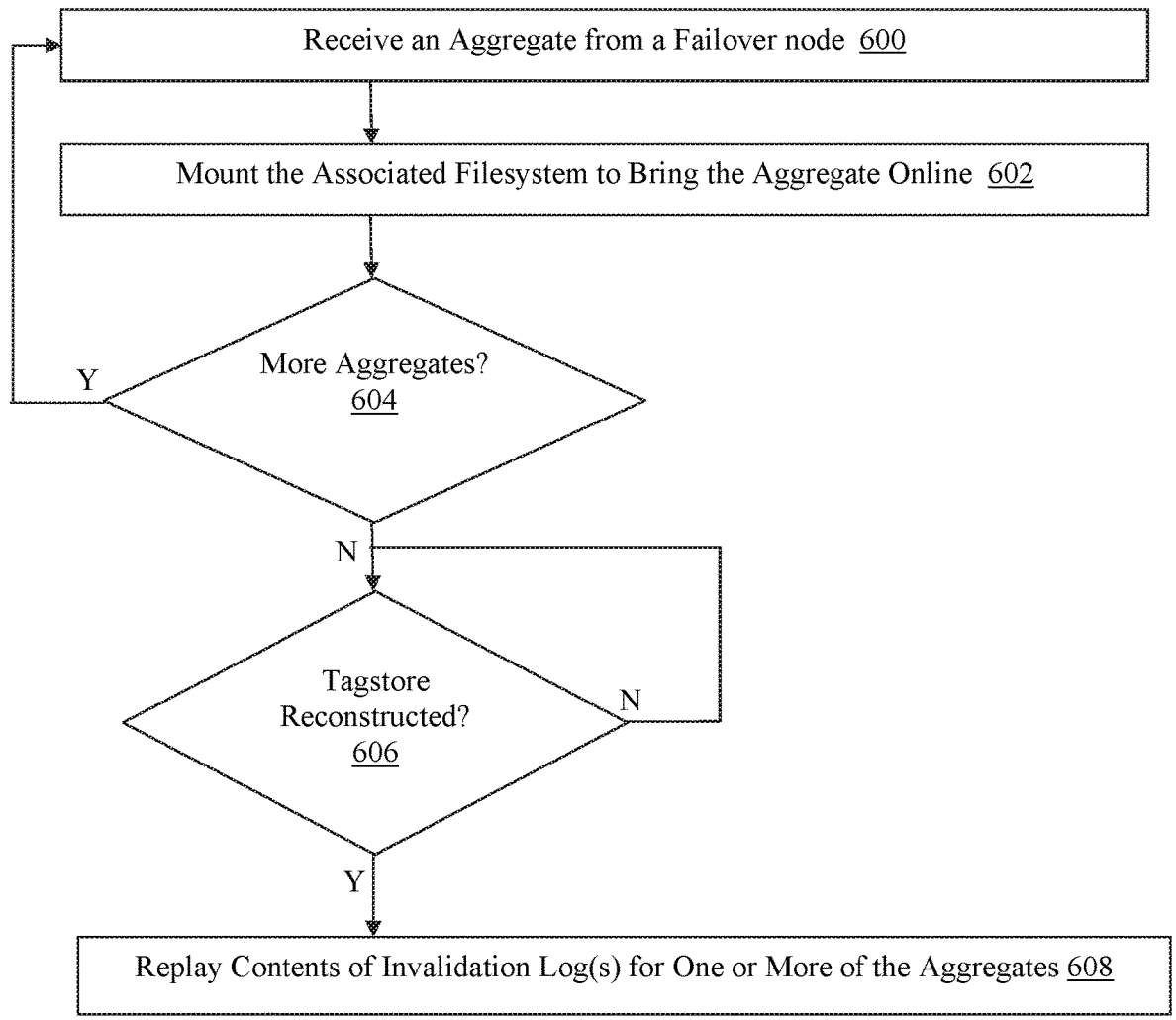
FIG. 6 is a flowchart of an exemplary method for bringing, by a takeover node, aggregates received from a failover node online.

Referring more specifically to FIG. 6, a flowchart of an exemplary method for bringing, by a takeover node, aggregates received from a failover node online is illustrated. In step 600 in this example, the takeover node computing device 106(n) receives an aggregate from the failover node computing device 106(1). The aggregate could have been transitioned by the failover node computing device 106(1) as described and illustrated in more detail earlier with reference to step 306 of FIG. 3, for example.

In step 602, the takeover node computing device 106(n) mounts the filesystem associated with the aggregate. The takeover node computing device 106(n) can also obtain ownership of the aggregate subsequent to mounting the filesystem in order to bring the aggregate online.

In step 604, the takeover node computing device 106(n) determines whether there are more aggregates hosted by the failover node computing device 106(1) that are to be transitioned to the takeover node computing device 106(n). In this example, the aggregates can be identified in the metafile retrieved as described and illustrated earlier with reference to step 402 of FIG. 4, for example, although other methods of determining whether there are more aggregates to be transitioned can also be used in other example.

If the takeover node computing device 106(n) determines that there are more aggregates, then the Yes branch is taken to step 600 and the takeover node computing device 106(n) effectively waits for the failover node computing device 106(1) to transition another aggregate. However, if the takeover node computing device 106(n) determines in step 604 that there are no more aggregates to be transitioned, then the No branch is taken to step 606.

In step 606, the takeover node computing device 106(n) determines whether the reconstruction of the remote tagstore 222(1) described and illustrated in more detail earlier with reference to FIG. 5 has completed. As explained earlier, the reconstruction of the remote tagstore 222(1) is a background process that can occur while aggregates are being brought online from the failover node computing device 106(1). Accordingly, either the reconstruction or transition of the aggregates can complete first.

If the takeover node computing device 106(n) determines that the remote tagstore 222(1) is not yet reconstructed, then the No branch is taken back to step 606 and the takeover computing device 106(n) effectively waits for the reconstruction to complete. However, if the takeover node computing device 106(n) determines in step 66 that the remote tagstore 222(1) has been reconstructed, then the Yes branch is taken to step 608.

In step 608, the takeover node computing device 106(n) replays contents of any invalidation log(s) included in one or more of the transitioned aggregates. The invalidation logs could have been updated as described and illustrated in more detail earlier with reference to step 314 of FIG. 3. The replay of the invalidation logs will invalidate any tags, and associated contents of the cache 224(1), of the local tagstore 222(n) that originated from the remote tagstore 222(1). Until the remote tagstore 222(1) is reconstructed, a tag that is invalidated based on contents of an invalidation log in an aggregate may not be incorporated into the local tagstore 222(1) and available for invalidation.

Referring back to FIG. 4, in step 410 the takeover node computing device 106(n) determines whether a storage operation has been received, such as from one of the client devices 108(1)-108(n), for example. If the takeover node computing device 106(n) determines that a storage operation has not been received, then the No branch is taken back to step 406 and the takeover node computing device 106(n) continues reconstructing the remote tagstore 222(1) in step 406 and/or bringing aggregates online in step 408. However, if the takeover node computing device 106(n) determines that a storage operation has been received then the Yes branch is taken to step 412.

In step 412, the takeover node computing device 106(n) determines whether the remote tagstore 222(1) has been reconstructed. In this example, the storage operation received in step 410 is associated with data hosted by an aggregate that has been brought online by the takeover node computing device 106(n). Any storage operations associated with data hosted by an aggregate that has not been brought online by the takeover node computing device 106(n) will be received by the failover node computing device 106(1) as described and illustrated in more detail earlier with reference to step 308. If the takeover node computing device 106(n) determines that reconstruction of the remote tagstore 222(1) has not completed, then the No branch is taken to step 414.

In step 414, the takeover node computing device 106(n) services received storage operations from non-cache locations (e.g., from the aggregate(s) hosted by the data storage devices 110(1)-110(n)). Since contents of the cache 224(1) may not be accurate, the cache 224(1) cannot be reliably used to service storage operations. For example, if an aggregate is brought online, but reconstruction of the remote tagstore 222(1) has not completed, the local tagstore 222(n) could include tag(s) invalidated by contents of invalidation log(s) that have not yet been replayed as described and illustrated with reference to step 608 of FIG. 6.

Subsequent to servicing a received storage operation in step 414, the takeover node computing device 106(n) proceeds back to step 406 in this example. However, if the takeover node computing device 106(n) determines in step 412 that the remote tagstore 222(1) has been reconstructed, then the Yes branch is taken to step 416.

In step 416, the takeover node computing device 106(n) services the received storage operation from both cache 224(1) and non-cache location (e.g., aggregates hosted by the data storage device(s) 110(1)-110(n)). If the takeover node computing device 106(n) determines in step 412 that the remote tagstore 222(1) has been reconstructed then the contents of invalidation log(s) for the aggregate(s) brought online will have been replayed and the cache 224(1) will be available for reliable use by the takeover node computing device 106(n) to service received storage operations.

Accordingly, with this technology, a cache of a failover node undergoing a takeover event can be leveraged for use servicing storage operations by a takeover node relatively quickly and irrespective of whether the failover node comes back online. The contents of the cache on the failover node are prevented from going cold during a takeover event with this technology, and the benefits of the cache are maintained throughout the takeover event. Therefore, this technology facilitates improved storage network performance and reduced latency for storage operations in failure domains and HA storage environments.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    retrieving, by a takeover computing device, a tag from a snapshot of a remote tagstore for a cache, wherein the remote tagstore and the cache are hosted by a failover computing device coupled to the takeover computing device via a cluster fabric and the tag comprises a location of data in the cache;
    inserting, by the takeover computing device, the tag into a local tagstore hosted by the takeover computing device;
    replaying, by the takeover computing device, an invalidation log for an aggregate received from the failover computing device subsequent to mounting a filesystem that is associated with the aggregate and comprises the data, wherein the invalidation log comprises an indication of one or more entries in the cache that were invalidated subsequent to capture of the snapshot; and
    retrieving, by the takeover computing device, the data from the cache after replaying the invalidation log, and after determining the location of the data from the tag in the local tagstore, in order to service a received storage operation associated with the data.

2. The method of claim 1, wherein the cache is hosted by a flash storage device of the failover computing device and the flash storage device comprises two or more ports.

3. The method of claim 2, further comprising retrieving, by the takeover computing device, a metafile from the flash storage device in response to receipt of a notification of a takeover event from the failover computing device, wherein the metafile comprises at least another location of the snapshot of the remote tagstore on the flash storage device.

4. The method of claim 1, further comprising determining, by the takeover computing device, that a reference count in the tag exceeds a threshold prior to insertion of the tag into the local tagstore.

5. The method of claim 1, further comprising setting, by the takeover computing device, a flag in the tag upon insertion of the tag into the local tagstore, wherein the flag indicates that the tag originated from the remote tagstore.

6. The method of claim 1, wherein the entries were invalidated as a result of one or more other storage operations associated with contents of the aggregate that were serviced prior to receipt of the aggregate from the failover computing device.

7. A non-transitory machine readable medium having stored thereon instructions for cache rewarming in a failover domain comprising machine executable code which when executed by at least one machine causes the machine to:
    determine when a reference count in a tag retrieved from a snapshot of a remote tagstore for a cache hosted by a failover computing device exceeds a threshold;
    insert the tag into a local tagstore, when the determination indicates the reference count in the tag exceeds the threshold, wherein the tag comprises a location of data in the cache;
    replay an invalidation log for an aggregate received from the failover computing device subsequent to mounting a filesystem that is associated with the aggregate and comprises the data; and
    retrieve the data from the cache following determination of the location from the tag in the local tagstore in order to service a received storage operation associated with the data.

8. The non-transitory machine readable medium of claim 7, wherein the cache is hosted by a flash storage device of the failover computing device and the flash storage device comprises two or more ports.

9. The non-transitory machine readable medium of claim 8, wherein the machine executable code when executed by the machine further causes the machine to retrieve a metafile from the flash storage device in response to receipt of a notification of a takeover event from the failover computing device, wherein the metafile comprises at least another location of the snapshot of the remote tagstore on the flash storage device.

10. The non-transitory machine readable medium of claim 7, wherein the machine executable code when executed by the machine further causes the machine to set a flag in the tag upon insertion of the tag into the local tagstore, wherein the flag indicates that the tag originated from the remote tagstore.

11. The non-transitory machine readable medium of claim 7, wherein the invalidation log comprises an indication of one or more entries in the cache invalidated as a result of one or more other storage operations associated with contents of the aggregate that were serviced prior to receipt of the aggregate from the failover computing device.

12. A takeover computing device, comprising:
    a memory containing machine readable medium comprising machine executable code having stored thereon instructions for cache rewarming in a failover domain; and
    a processor coupled to the memory, the processor configured to execute the machine executable code to cause the processor to:

insert a tag into a local tagstore, wherein the tag comprises a location of data in a cache hosted by a failover computing device and is retrieved from a snapshot of a remote tagstore for the cache;

set a flag in the tag upon insertion of the tag into the local tagstore, wherein the flag indicates that the tag originated from the remote tagstore;

replay an invalidation log for an aggregate received from the failover computing device subsequent to mounting a filesystem that is associated with the aggregate and comprises the data; and retrieve the data from the cache following determination of the location from the tag in the local tagstore in order to service a received storage operation associated with the data.

13. The takeover computing device of claim 12, wherein the cache is hosted by a flash storage device of the failover computing device and the flash storage device comprises two or more ports.

14. The takeover computing device of claim 13, wherein the machine executable code to further cause the processor to retrieve a metafile from the flash storage device in response to receipt of a notification of a takeover event from the failover computing device, wherein the metafile comprises at least another location of the snapshot of the remote tagstore on the flash storage device.

15. The takeover computing device of claim 12, wherein the machine executable code to further cause the processor to determine that a reference count in the tag exceeds a threshold prior to insertion of the tag into the local tagstore.

16. The takeover computing device of claim 12, wherein the invalidation log comprises an indication of one or more entries in the cache invalidated as a result of one or more other storage operations associated with contents of the aggregate that were serviced prior to receipt of the aggregate from the failover computing device.

17. A takeover computing device, comprising:

a memory containing machine readable medium comprising machine executable code having stored thereon instructions for cache rewarming in a failover domain; and a processor coupled to the memory, the processor configured to execute the machine executable code to cause the processor to:

determine when a reference count in a tag retrieved from a snapshot of a remote tagstore for a cache hosted by a failover computing device exceeds a threshold;

insert the tag into a local tagstore, when the determination indicates the reference count in the tag exceeds the threshold, wherein the tag comprises a location of data in the cache;

replay an invalidation log for an aggregate received from the failover computing device subsequent to mounting a filesystem that is associated with the aggregate and comprises the data; and retrieve the data from the cache following determination of the location from the tag in the local tagstore in order to service a received storage operation associated with the data.

18. The takeover computing device of claim 17, wherein the cache is hosted by a flash storage device of the failover computing device and the flash storage device comprises two or more ports.

19. The takeover computing device of claim 18, wherein the machine executable code when executed by the machine further causes the machine to retrieve a metafile from the flash storage device in response to receipt of a notification of a takeover event from the failover computing device, wherein the metafile comprises at least another location of the snapshot of the remote tagstore on the flash storage device.

20. The takeover computing device of claim 17, wherein the machine executable code when executed by the machine further causes the machine to set a flag in the tag upon insertion of the tag into the local tagstore, wherein the flag indicates that the tag originated from the remote tagstore.

21. The takeover computing device of claim 17, wherein the invalidation log comprises an indication of one or more entries in the cache invalidated as a result of one or more other storage operations associated with contents of the aggregate that were serviced prior to receipt of the aggregate from the failover computing device.

* * * * *